(12) United States Patent
Eck et al.

(10) Patent No.: US 12,029,998 B2
(45) Date of Patent: Jul. 9, 2024

(54) FLEXIBLE SHELL STRUCTURE FOR SHOW ELEMENTS

(71) Applicant: UNIVERSAL CITY STUDIOS LLC, Universal City, CA (US)

(72) Inventors: Timothy J. Eck, Windermere, FL (US); Anisha Vyas, Orlando, FL (US); Haz Minor, Wyoming, OH (US); Phil Said, South Lyon, MI (US)

(73) Assignee: Universal City Studios LLC, Universal City, CA (US)

( * ) Notice: Subject to any disclaimer, the term of this patent is extended or adjusted under 35 U.S.C. 154(b) by 318 days.

(21) Appl. No.: 17/543,584

(22) Filed: Dec. 6, 2021

(65) Prior Publication Data

US 2022/0176266 A1    Jun. 9, 2022

Related U.S. Application Data

(60) Provisional application No. 63/122,454, filed on Dec. 7, 2020.

(51) Int. Cl.
*A63J 1/02* (2006.01)
*A63J 19/00* (2006.01)

(52) U.S. Cl.
CPC ............ *A63J 19/006* (2013.01); *A63J 1/02* (2013.01)

(58) Field of Classification Search
CPC .. A63J 7/00; A63J 7/005; A63J 19/006; B25J 9/10; B25J 9/12; B25J 9/16
USPC .................................................. 472/84, 330
See application file for complete search history.

(56) References Cited

U.S. PATENT DOCUMENTS

| 3,866,807 | A | 2/1975 | Parr |
| 4,154,183 | A * | 5/1979 | Nunez ................. A63J 7/005 |
| | | | 2/302 |
| 8,761,927 | B2 | 6/2014 | Johnson et al. |
| 2005/0283043 | A1 | 12/2005 | Sisk |

(Continued)

FOREIGN PATENT DOCUMENTS

| CN | 205969056 U | 2/2017 |
| CN | 111959726 A | 11/2020 |

OTHER PUBLICATIONS

Press Trust of India. Scientists Create Jumping Soft Robot Using 3-D Printer. The Economic Times, Jul. 10, 2015 [online], [retrieved on Dec. 6, 2021]. Retrieved from Internet: < URL:https://economictimes.indiatimes.com/news/science/scientists-create-jumping-soft-robot-using-3-d-printer/articleshow/48017721.cms?from=mdr>.

(Continued)

*Primary Examiner* — Kien T Nguyen
(74) *Attorney, Agent, or Firm* — LOZA & LOZA, LLP; Lew Edward V. Macapagal

(57) ABSTRACT

Aspects of the present disclosure are related to a flexible shell structure. The flexible shell structure includes a plurality of rigid support strips that collectively define a three-dimensional shape of at least one part of a character form. The flexible shell structure further includes at least one coupling member configured to couple two or more rigid support strips of the plurality of rigid support strips. The at least one coupling member enables the flexible shell structure to flex when a first force is applied to the flexible shell structure in a first direction, and enables the flexible shell structure to resist flexing when a second force is applied to the flexible shell structure in a second direction.

25 Claims, 14 Drawing Sheets

(56) References Cited

U.S. PATENT DOCUMENTS

2007/0021032 A1     1/2007   Tye et al.
2017/0095925 A1     4/2017   Yamane et al.

OTHER PUBLICATIONS

International Search Report and Written Opinion, PCT/2021/062181, Jan. 14, 2022, 8 pgs.

* cited by examiner

FLEXIBLE SHELL STRUCTURE FOR SHOW ELEMENTS

CROSS REFERENCE TO RELATED APPLICATION(S)

This application claims the benefit of U.S. Provisional Application Ser. No. 63/122,454, entitled "FLEXIBLE SHELL STRUCTURE FOR SHOW ELEMENTS" and filed on Dec. 7, 2020, which is expressly incorporated by reference herein in its entirety.

TECHNICAL FIELD

The technology discussed below relates generally to a shell structure, and more specifically to a flexible shell structure for show elements.

INTRODUCTION

Show elements, such as animated figures (e.g., robots), may incorporate shell structures to achieve a desired aesthetic appearance. For example, a rigid shell structure shaped to resemble a part of a character form (e.g., a human chest or torso, a part of a fictional creature, etc.) may be used to enclose the hardware (e.g., electromechanical actuators, electronics, cables, etc.) that controls the movements of a show element. The size and shape of these shell structures are typically defined by the aesthetic requirements of the show elements. As a result, these shell structures may oftentimes limit the mechanical capabilities (e.g., a range of motion) of the show elements.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure are related to a flexible shell structure. The flexible shell structure includes a plurality of rigid support strips that collectively define a three-dimensional shape of at least one part of a character form. The flexible shell structure further includes at least one coupling member configured to couple two or more rigid support strips of the plurality of rigid support strips. The at least one coupling member enables the flexible shell structure to flex when a first force is applied to the flexible shell structure in a first direction, and enables the flexible shell structure to resist flexing when a second force is applied to the flexible shell structure in a second direction.

In one example, a method for generating a flexible shell structure is disclosed. The method includes generating a plurality of rigid support strips that collectively define a three-dimensional shape of at least one part of a character form. The method further includes coupling two or more rigid support strips of the plurality of rigid support strips with at least one coupling member. The at least one coupling member enables the flexible shell structure to flex when a first force is applied to the flexible shell structure in a first direction, and enables the flexible shell structure to resist flexing when a second force is applied to the flexible shell structure in a second direction.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and/or packaging arrangements.

Figure 1B:
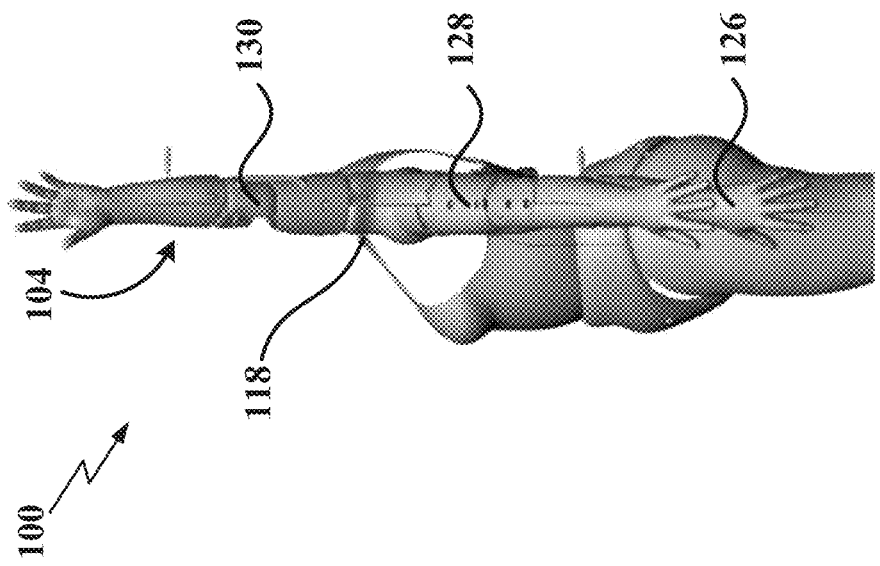
FIG. 1 (including FIGS. 1A through 1D) shows examples of the range of motion of an articulated arm of an animated figure.
Figure 1A:
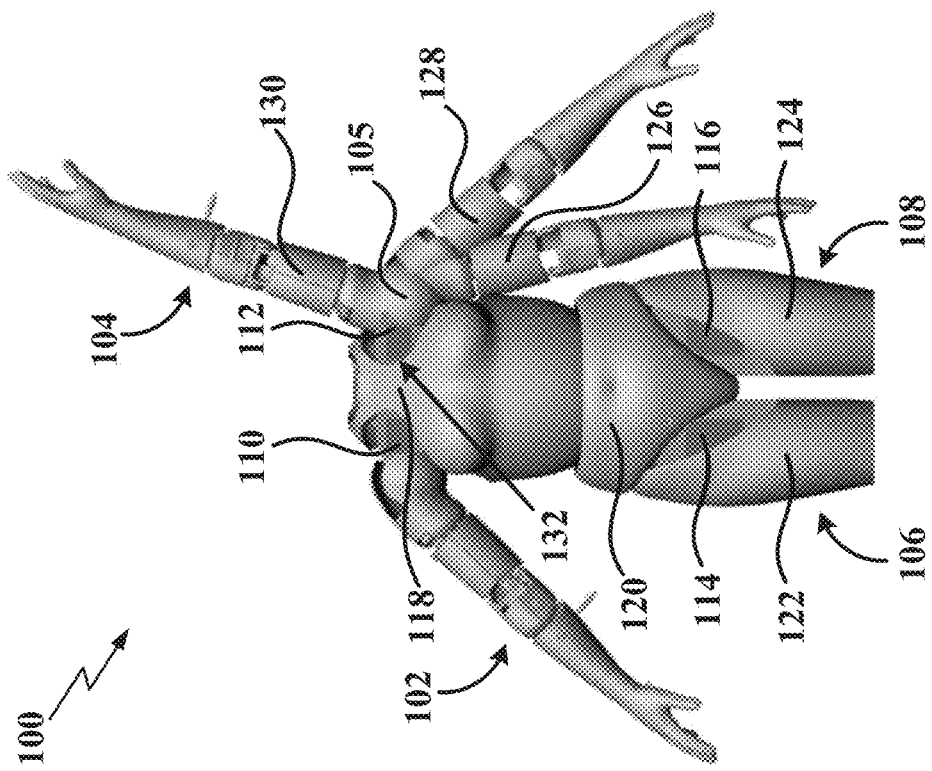
Figure 1D:
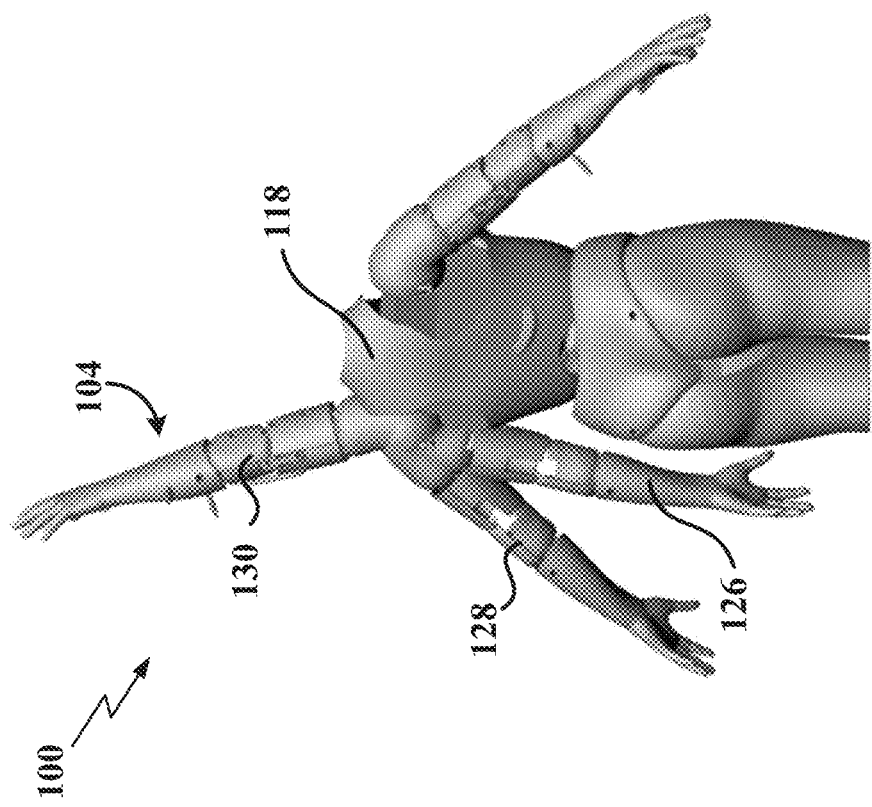
Figure 1C:
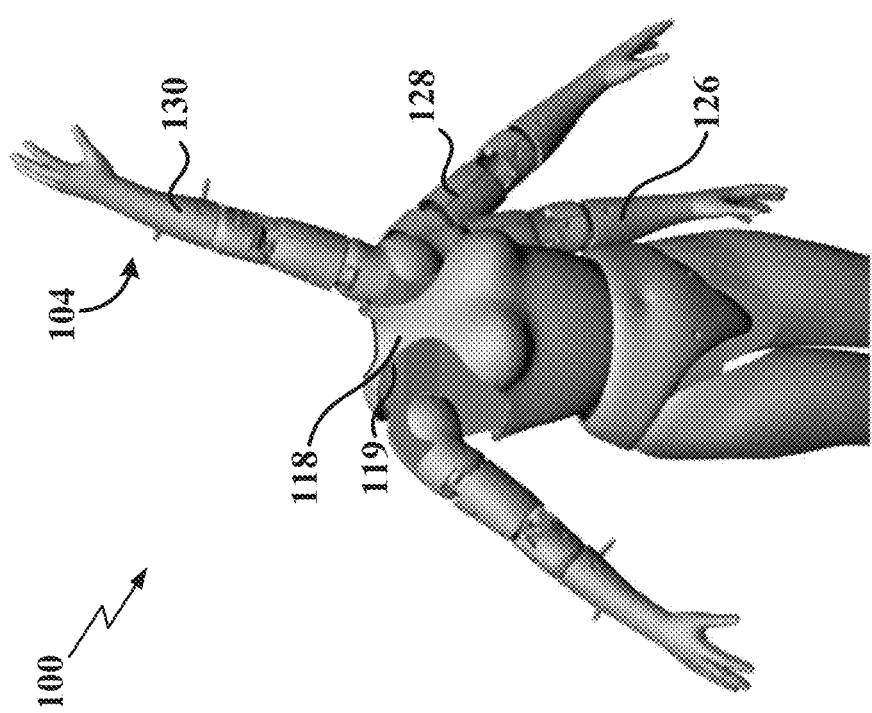

FIG. 1 (including FIGS. 1A through 1D) illustrates an animated FIG. 100 (also referred to as a robot), where FIG. 1A shows a front view of the animated FIG. 100, FIG. 1B shows a side view of the animated FIG. 100, FIG. 1C shows a front perspective view of the animated FIG. 100, and FIG. 1D shows a rear perspective view of the animated FIG. 100. The animated FIG. 100 has articulated arms 102, 104 and articulated legs 106, 108. As shown in FIG. 1A, the articulated arms 102, 104 may be controlled by respective electromechanical actuators 110, 112, and the articulated legs 106, 108 may be controlled by respective electromechanical actuators 114, 116.

In some examples, the animated FIG. 100 may be configured for use as a show element or for other entertainment purposes. As used herein, the term "show element" may refer to a tangible figure, a tangible object, a tangible device, or a tangible system crafted or produced for theatrical or entertainment purposes. For example, the animated FIG. 100 may be configured as a character for a live show, an attraction (e.g., a ride or display in a theme park), a television show, a feature film, and/or other suitable entertainment applications. Accordingly, and as shown in FIG. 1A, the animated FIG. 100 may include one or more solid shell structures (e.g., solid shell structures 118, 120, 122, 124) that provide a desired aesthetic appearance for the animated figure. In some examples, each of the solid shell structures may be formed using a rigid material (e.g., plastic, a 3D printed part, or other suitable material) and may have a shape of a character form or a part of a character form. In some examples, each of the solid shell structures may be covered with a flexible material (e.g., silicone, urethane, foam, rubber, and/or other suitable materials) to give the appearance of a lifelike outer skin for the animated FIG. 100.

In other examples, a show element may not be animated (e.g., may not be actuated with electromechanical actuators). For example, a show element may be a static prop, such as a bumper of an automobile to be used in a theatrical production. In this example, the flexible shell described herein may be implemented in the shape of the bumper. Therefore, when a live actor (e.g., a live actor playing a part of a superhero character possessing great strength) pushes on the bumper, the bumper may deflect in at least one direction to give the illusion that the bumper has deformed.

As used herein, the term "character form" may refer to the appearance, likeness, and/or aesthetic qualities of a particular character. In some examples, the character may be a fictional character, such as a fictional person, animal, or creature. In other examples, the character may be an anthropomorphic object (e.g., a talking tree or a lamp having animated arms and/or legs). In yet other examples, the character may be a non-fictional character, such as a person (e.g., a historical figure) or a realistic animal (e.g., a horse, a dog, etc.).

One or more of the solid shell structures of the animated FIG. 100 may serve as a structure for supporting a covering. In some examples, the covering may be a stage costume, a uniform, an outfit, etc. and may include one or more garments, such as a shirt, dress, coat, robe, and/or other suitable clothing items. For example, the solid shell structure 118 may support a shirt of the animated FIG. 100, where the shape of the solid shell structure 118 simulates the presence of a human torso underneath the shirt.

Each of the articulated arms 102, 104 and the articulated legs 106, 108 of the animated FIG. 100 may have a range of motion. For example, as shown in FIG. 1A, the articulated arm 104 of the animated FIG. 100 may have a lateral range of motion defined by a lowest position 126 and a highest position 130. Therefore, in this example, the articulated arm 104 may be laterally moved to an intermediary lateral position (e.g., intermediary lateral position 128) between the lowest position 126 and the highest position 130. As shown in FIG. 1A, the solid shell structure 118 may include an articulation clearance feature at or near an electromechanical actuator of each articulated arm, such as the articulation clearance feature 132 exposing the electromechanical actuator 112 of the articulated arm 104. The articulation clearance feature 132 may enable raising and lowering of the articulated arm 104 without obstruction by the solid shell structure 118.

Figures 2A, 2B:
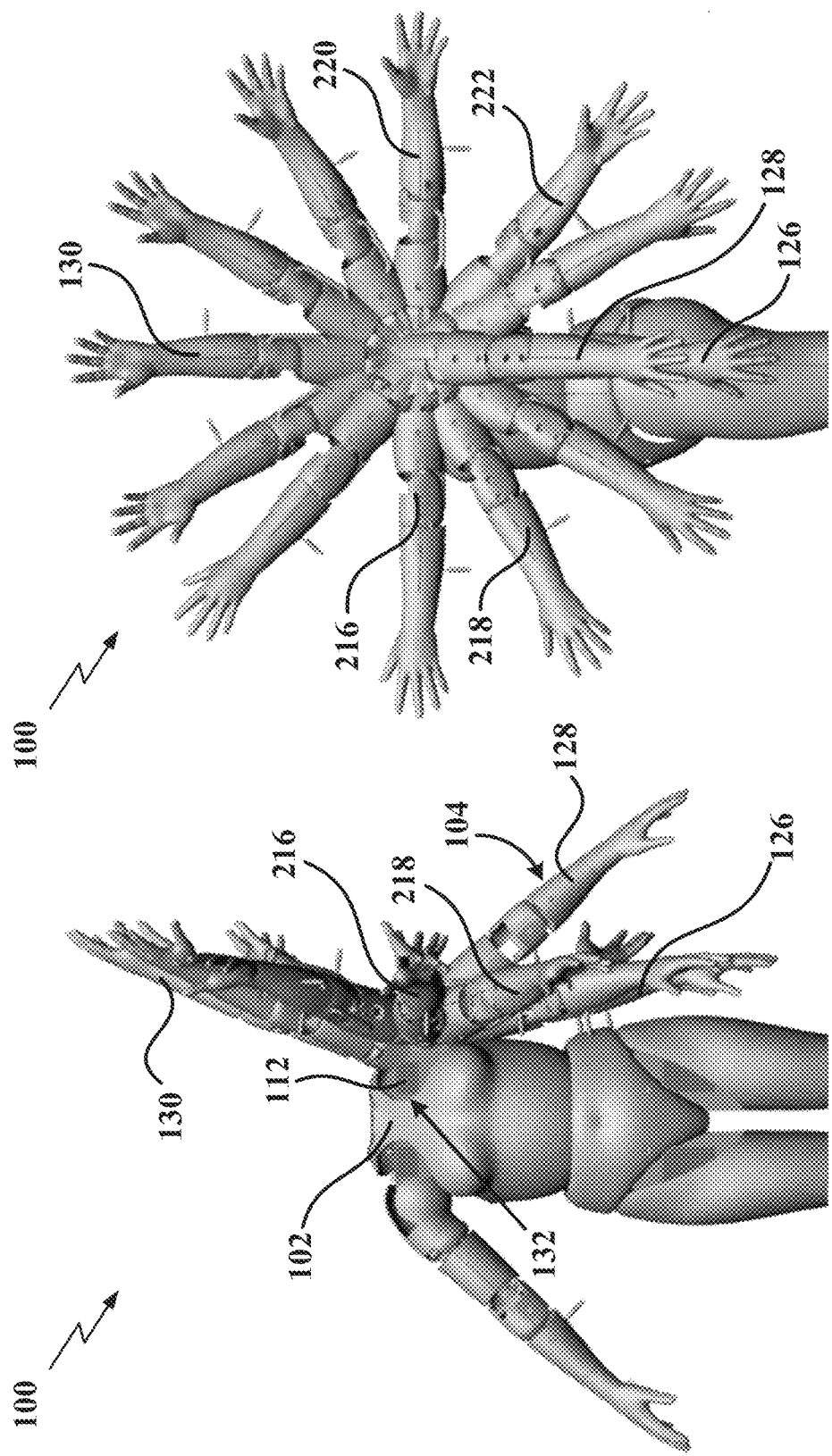
FIG. 2 (including FIGS. 2A through 2D) shows further examples of the range of motion of an articulated arm of an animated figure.
Figure 2C:
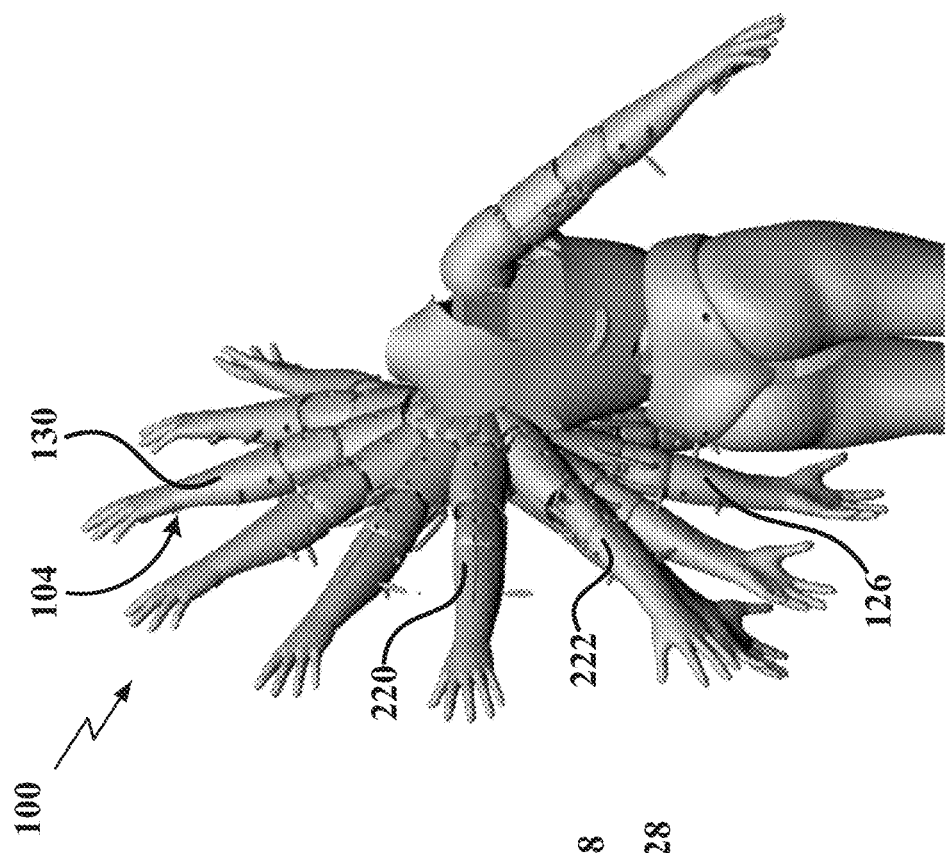
Figure 2D:
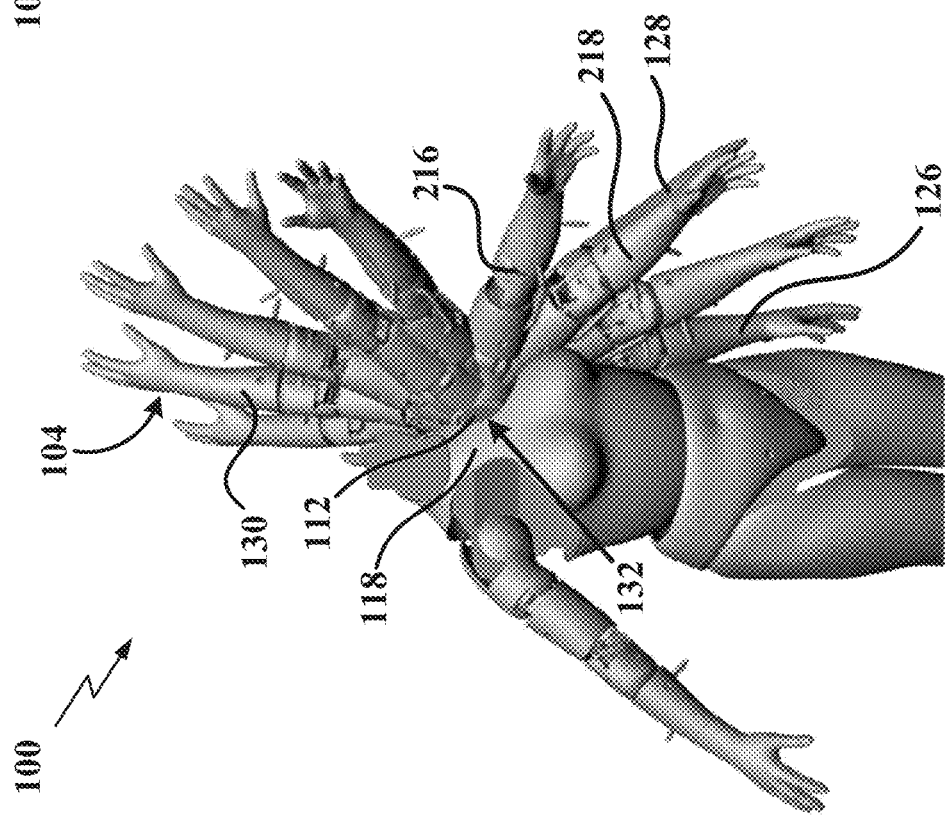

FIG. 2 (including FIGS. 2A through 2D) shows further examples of the range of motion of the articulated arm 104.

FIG. 2A shows a front view of the animated FIG. 100, FIG. 2B shows a side view of the animated FIG. 100, FIG. 2C shows a front perspective view of the animated FIG. 100, and FIG. 2D shows a rear perspective view of the animated FIG. 100. As shown in FIGS. 2A and 2B, the electromechanical actuator 112 may rotate the articulated arm 104 of the animated FIG. 100. For example, the articulated arm 104 may be moved to the lowest position 126, a forward horizontal position 216, the highest position 130, a rear horizontal position 220, or an intermediary position (e.g., intermediary position 218, 222). As shown in FIG. 2A, the articulation clearance feature 132 may enable the articulated arm 104 to rotate without being obstructed by the solid shell structure 118.

Figures 3A, 3B:
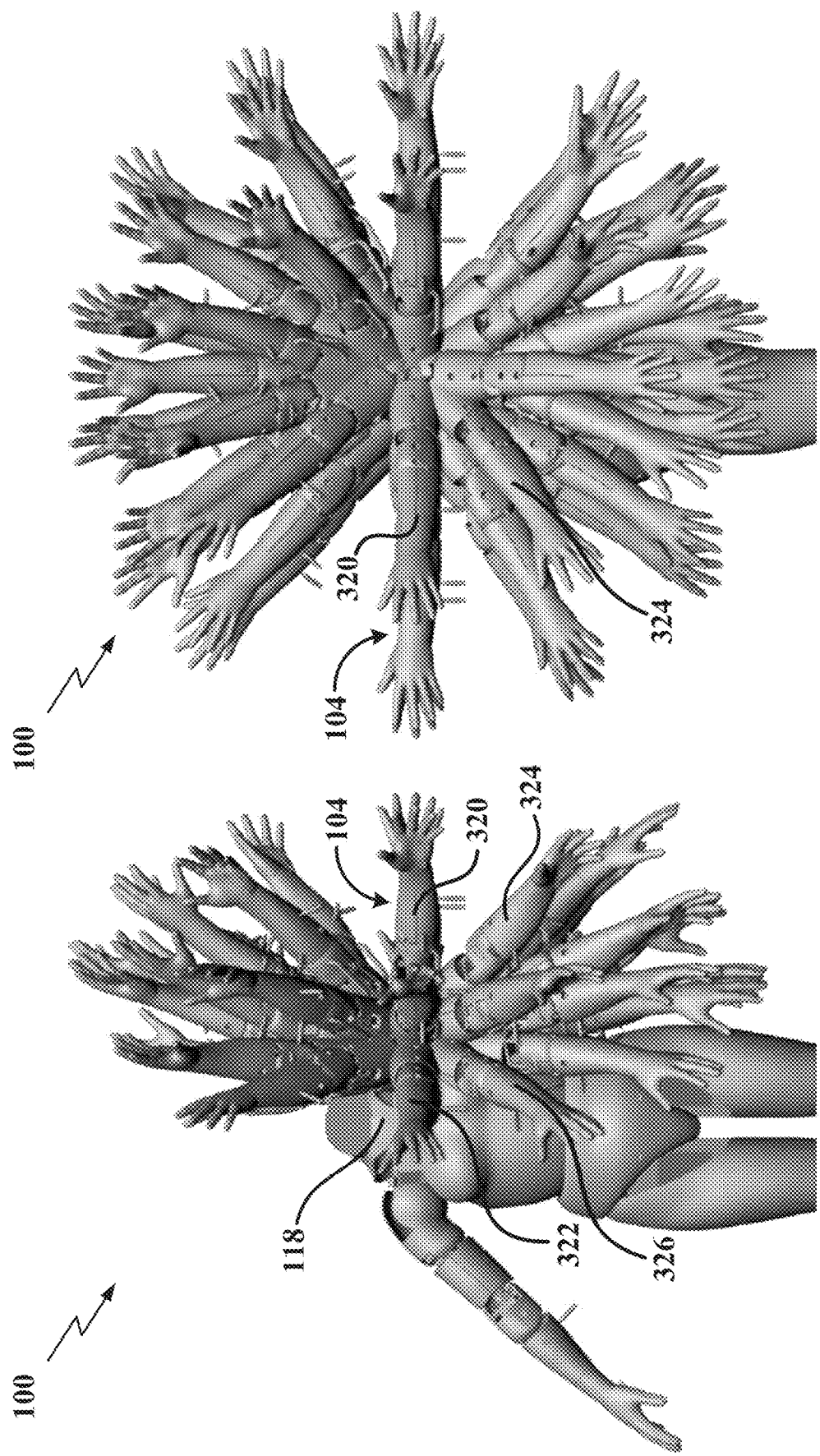
FIG. 3 (including FIGS. 3A through 3D) shows further examples of the range of motion of an articulated arm of an animated figure.
Figures 3C, 3D:
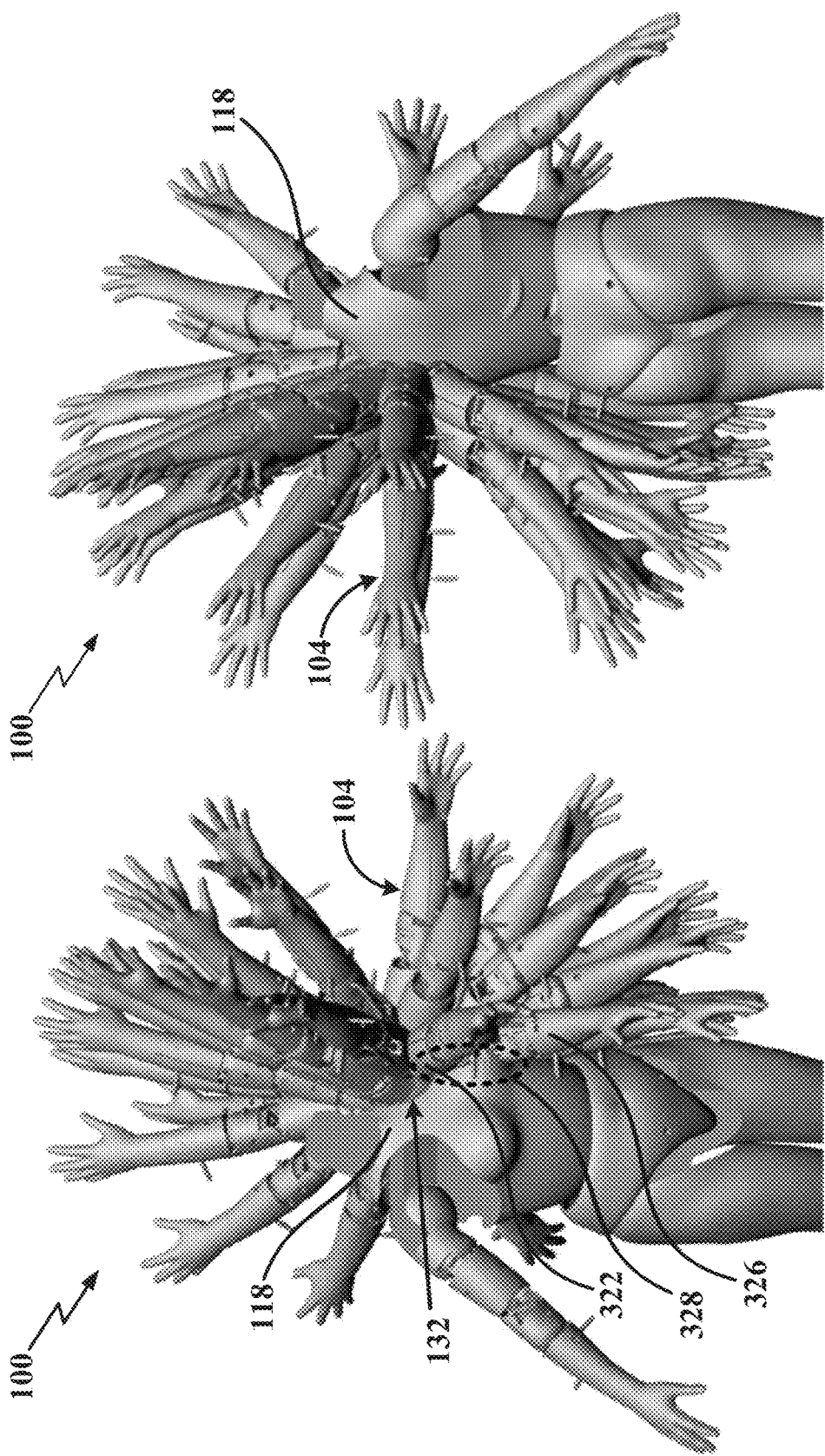

FIG. 3 (including FIGS. 3A through 3D) shows further examples of the range of motion of the articulated arm 104. FIG. 3A shows a front view of the animated FIG. 100, FIG. 3B shows a side view of the animated FIG. 100, FIG. 3C shows a front perspective view of the animated FIG. 100, and FIG. 3D shows a rear perspective view of the animated FIG. 100. As shown in FIG. 3A, the articulated arm 104 of the animated FIG. 100 may be moved side to side. For example, the articulated arm 104 may be moved from a first position 320 to a second position 322. As another example, the articulated arm 104 may be moved from a third position 324 to a fourth position 326. The solid shell structure 118 may obstruct the movement of the articulated arm 104 (e.g., when the articulated arm 104 is moved to the second position 322 or the fourth position 326) and may limit the range of motion (e.g., the side to side range of motion) of the articulated arm 104. With reference to FIG. 3C, it should be noted that the articulation clearance feature 132 may not provide sufficient clearance for the articulated arm 104 when the articulated arm 104 is moved to the second position 322 or the fourth position 326. In some scenarios, the articulated arm 104 may impact the solid shell structure 118 (e.g., in the area 328) and may damage the solid shell structure 118.

Figure 4:
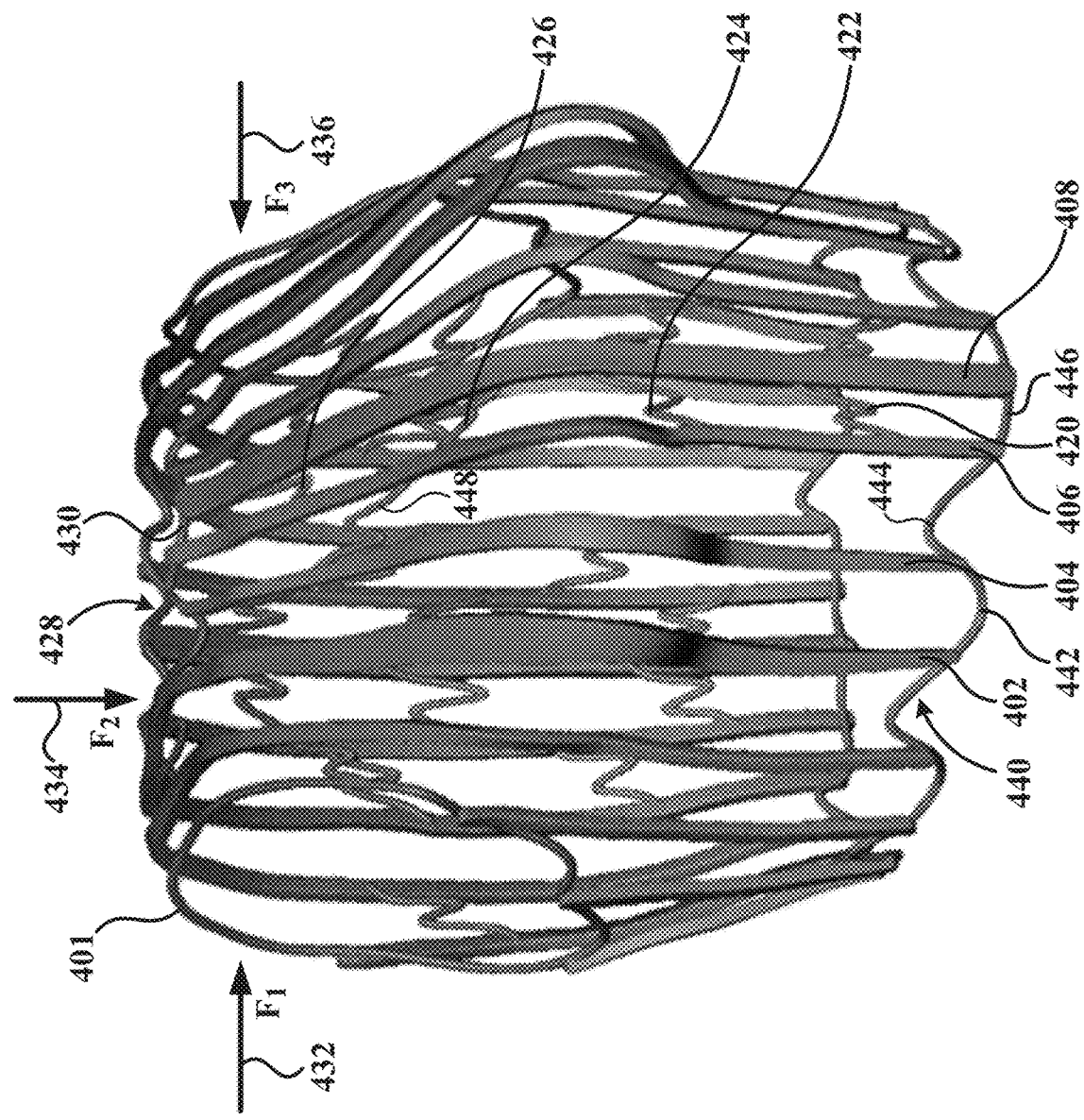
FIG. 4 illustrates a flexible shell structure in accordance with various aspects of the disclosure.

FIG. 4 illustrates a flexible shell structure 400 in accordance with various aspects of the disclosure. In some examples, and as described herein, the flexible shell structure 400 may be a part of a show element or may be configured for other entertainment purposes. For example, at least one portion of the flexible shell structure 400 may be coupled or attached to a show element structure (e.g., the flexible shell structure 400 may be hard mounted at a region 119 on the animated FIG. 100 in FIG. 1). In some examples, the show element structure may be an animated figure, a robotic figure, a puppet, a walk-around character, an interactive character, a theatrical prop, a static prop, or an animated prop. In one example, the flexible shell structure 400 may replace the solid shell structure 118 described herein.

In some examples, the flexible shell structure 400 may be covered with a flexible material (e.g., silicone material, urethane material, foam material, rubber material, and/or other suitable materials) that simulates a skin for the character form. For example, the flexible material may have the color and texture of human skin to achieve a realistic appearance of a human torso. In other examples, if the aspects described herein are used to configure a flexible shell structure for a character form of an animal, the flexible material may have the color and texture (e.g., a furry texture) appropriate for the intended animal.

The flexible shell structure 400 may serve as a structure for supporting a covering. In some aspects of the disclosure, the covering may include a flexible material, such as a rubber material, a silicone material, a vinyl material, a urethane material, a neoprene material, a foam material, a fabric, and/or a textile. In some examples, the covering may be a stage costume (e.g., at least one item of clothing) as described herein. For example, the flexible shell structure 400 may support a shirt of the animated FIG. 100, where the shape of the flexible shell structure 400 simulates the presence of a human torso underneath the shirt.

As shown in FIG. 4, the flexible shell structure 400 may include a number of rigid support strips, such as the rigid support strips 401, 402, 404, 406, 408. In some examples, one or more of the rigid support strips may be formed using a rigid and relatively lightweight material, such as plastic or other suitable material. In some examples, one or more of the rigid support strips may be formed using a printer for producing three-dimensional (3D) parts (e.g., a 3D printer).

In some aspects of the disclosure, the rigid support strips may be designed to collectively define a three-dimensional shape of a character form or a part of a character form. For example, in the implementation of FIG. 4, the rigid support strips (e.g., the rigid support strips 401, 402, 404, 406, 408) define a three-dimensional shape of a human torso. In some example implementations, the three-dimensional shape may be a different part of a human character form, a part of an animal or creature character form, or a part of an object character form. For example, the three-dimensional shape may be a body, a leg, or a tail of an animal character form.

As shown in FIG. 4, the rigid support strips may be coupled together with one or more coupling members. For example, the rigid support strips 404 and 406 may be coupled together with a coupling member 440 (e.g., portion 444 of the coupling member 440) and a coupling member 448. As another example, the rigid support strips 406 and 408 may be coupled together with a coupling member 428 (e.g., portion 430 of the coupling member 428), a coupling member 440 (e.g., portion 446 of the coupling member 440), and coupling members 420, 422, 424, and 426. At least some of the coupling members are shaped to allow the flexible shell structure 400 to flex when a first force is applied to the flexible shell structure 400 in a first direction (e.g., a horizontal direction) and to resist flexing when a second force is applied to the flexible shell structure 400 in a second direction (e.g., a vertical direction).

In some aspects of the disclosure, at least a portion of the flexible shell structure 400 may be configured at or near a moveable joint (e.g., a shoulder joint 105 of the articulated arm 104 shown in FIG. 1A) of the show element structure, where the flexible shell structure 400 is configured to flex in response to a movement of the moveable joint (e.g., when the articulated arm 104 rotates about the shoulder joint 105 and makes contact with the flexible shell structure 400). In some aspects of the disclosure, the features of the flexible shell structure 400 as described herein may be used to form a flexible shell structure that simulates a shoulder joint (e.g., to simulate the appearance of shoulder muscles), an elbow joint, a wrist joint, a hip joint, an ankle joint, and/or other suitable joints of the animated FIG. 100.

For example, a coupling member (e.g., coupling member 420, 422, 424, 426, 428, 440) may be formed with a rigid or partially rigid material (e.g., plastic, 3D printed part). In some aspects of the disclosure, a coupling member may have a cylindrical shape or a tube shape, and may include one or more twists, turns, curves, and/or other suitable features that enable flexing. In some examples, the overall appearance of the coupling member may be described as a squiggle shape, a coil shape, or a spring shape. The coupling member may be configured to flex (e.g., bend or deflect) in response to a first force (e.g., force $F_1$ 432 or force $F_3$ 436) and resist flexing in response to a second force (e.g., force $F_2$ 434). As shown in FIG. 4, a direction of the first force (e.g., force $F_1$ 432 or force $F_3$ 436) may be approximately perpendicular to a direction of the second force (e.g., force $F_2$ 434). It should be understood that the coupling members of the flexible shell structure 400 allow the flexible shell structure 400 to return to its original shape when the first force (e.g., force $F_1$ 432 or force $F_3$ 436) is no longer applied.

Figure 5:
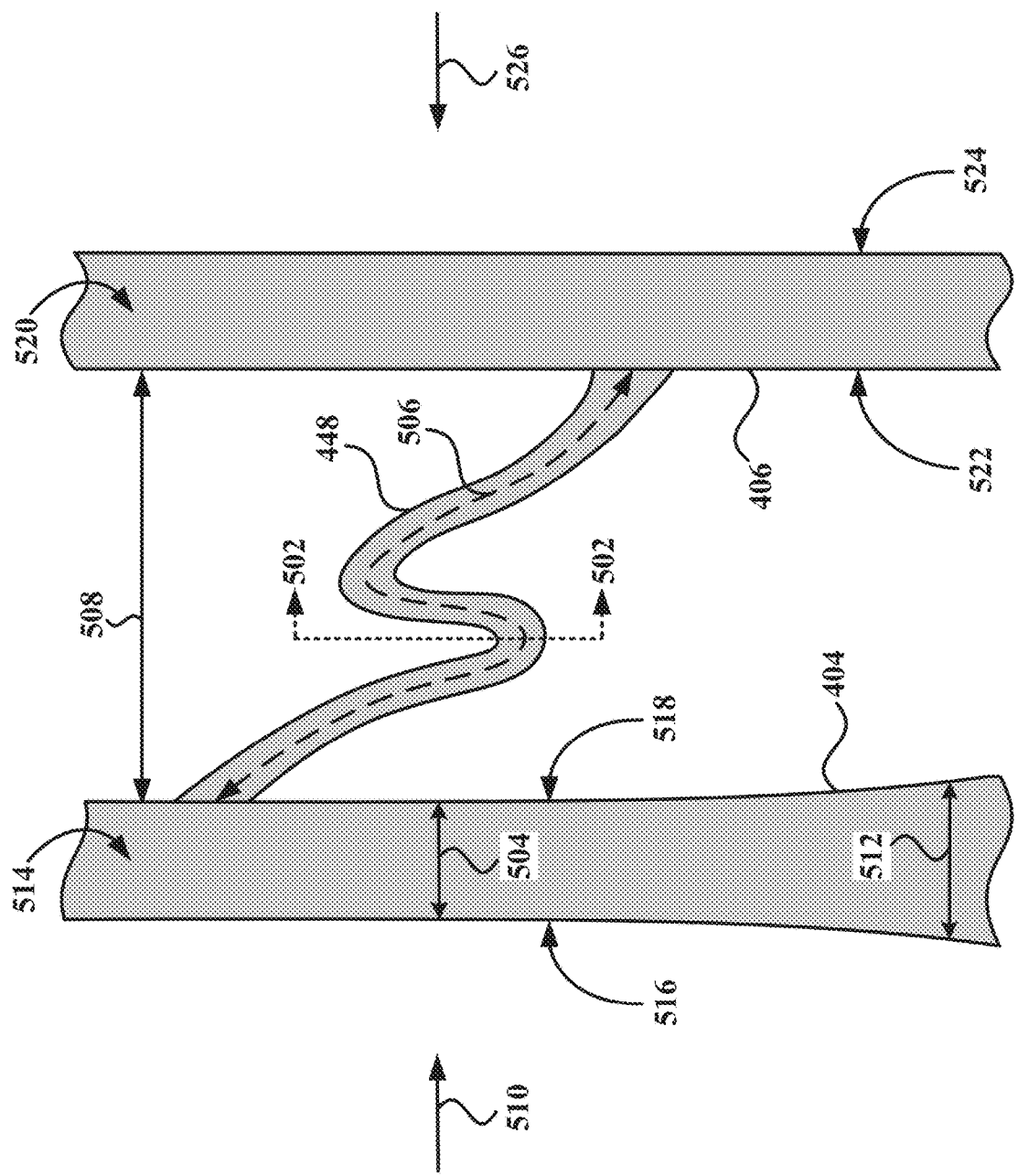
FIG. 5 illustrates a detailed view of rigid support strips and a coupling member in the flexible shell structure in accordance with various aspects of the disclosure.

In some aspects of the disclosure, the flexibility of the flexible shell structure 400 may be based on a length of each coupling member and/or a thickness of each coupling member. This is described in detail with reference to FIGS. 5 and 6. FIG. 5 shows a detailed view of the rigid support strips 404, 406 and the coupling member 448. As shown in FIG. 5, the rigid support strip 404 may include a front surface 514, a first side surface 516, and a second side surface 518. The rigid support strip 406 may include a front surface 520, a first side surface 522, and a second side surface 524. As further shown in FIG. 5, a first end of the coupling member 448 may be coupled to the second side surface 518 and a second end of the coupling member 448 may be coupled to the first side surface 522. In the example of FIG. 5, the flexibility of the flexible shell structure 400 may increase as the length 506 of the coupling member 448 is increased. In other examples, if an application requires that the flexible shell structure 400 be more rigid (e.g., for improved stability when supporting a heavy stage costume), the length 506 of the coupling member 448 may be reduced.

Figure 6:
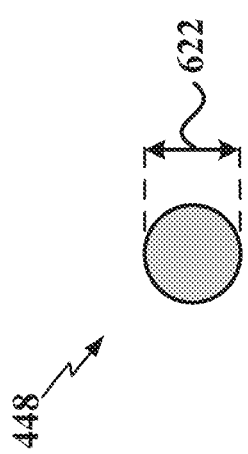
FIG. 6 shows a cross section of a coupling member in accordance with various aspects of the disclosure.

As another example, the flexibility of the flexible shell structure 400 may increase as the thickness of the coupling member 448 decreases. For example, FIG. 6 shows a cross section of the coupling member 448 in FIG. 5 along the line 502. In one example, the flexibility of the flexible shell structure 400 may increase as the diameter 622 of the coupling member 448 is decreased. In other examples, if an application requires that the flexible shell structure 400 be more rigid, the diameter 622 of the coupling member 448 may be increased. In some aspects of the disclosure, the thickness of the coupling member 448 may change along the length 506 of the coupling member 448.

In some aspects of the disclosure, a width of a rigid support strip may be different at different portions of the rigid support strip. For example, the rigid support strip 404 may have a first width 504 and a second width 512, where the second width 512 is greater than the first width 504. In some aspects of the disclosure, portions of a support strip may be made thicker to increase the rigidity and/or strength of the rigid support strip.

Figure 7:
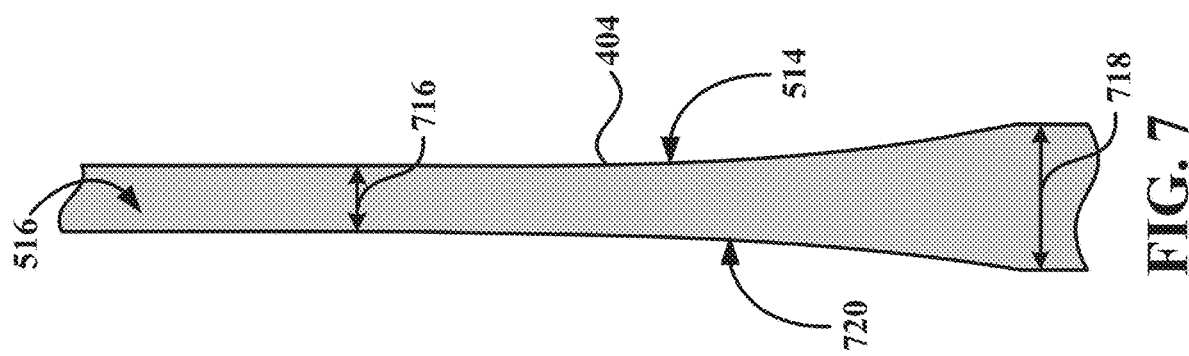
FIG. 7 shows a side view of a rigid support strip in accordance with various aspects of the disclosure.

In some aspects of the disclosure, a thickness of a rigid support strip may be different at different portions of the rigid support strip. For example, FIG. 7 shows a side view of the rigid support strip 404 (e.g., when observing the rigid support strip 404 from the direction of the arrow 510 in FIG. 5). As shown in FIG. 7, the rigid support strip 404 may have a first thickness 716 and a second thickness 718, where the second thickness 718 is greater than the first thickness 716. In some aspects of the disclosure, portions of a rigid support strip may be made thicker to increase the rigidity and/or strength of the rigid support strip.

Figure 8:
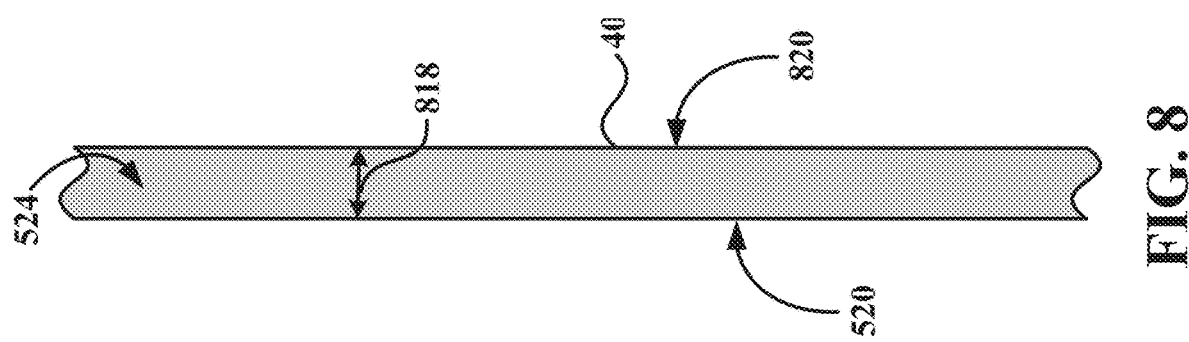
FIG. 8 shows a side view of a rigid support strip in accordance with various aspects of the disclosure.

In some aspects of the disclosure, a rigid support strip may have a uniform thickness. For example, FIG. 8 shows a side view of the rigid support strip 406 (e.g., when observing the rigid support strip 406 from the direction of the arrow 526 in FIG. 5). As shown in FIG. 8, the rigid support strip 406 may have a thickness 818.

In some aspects of the disclosure, the rigid support strips described herein may be spaced apart by one or more separation distances. In these aspects of the disclosure, larger separation distances may increase the flexibility of the flexible shell structure 400, while shorter separation distances may reduce the flexibility of the flexible shell structure 400. For example, with reference to FIG. 5, the rigid support strips 404 and 406 may be separated by a separation distance 508. In this example, the flexibility of the flexible shell structure 400 may increase as the separation distance 508 is increased. In other examples, if an application requires that the flexible shell structure 400 be more rigid, the separation distance 508 may be reduced. In some aspects of the disclosure, at least two of the separation distances may be different. For example, the rigid support strips proximate to the center of the flexible shell structure 400 (e.g., the rigid support strips 406 and 408) may have a shorter separation distance than the rigid support strips proximate to the ends of the flexible shell structure 400.

In some aspects of the disclosure, the flexible shell structure 400 may include a liner material (also referred to as a backing material) coupled to at least two of the rigid support strips. The liner material may span the gaps between the rigid support strips to provide additional support and/or mechanical protection for the flexible shell structure 400. In one example, the liner material may be coupled to a first front surface of a first rigid support strip (e.g., the front surface 514 of the rigid support strip 404) and a second front surface of a second rigid support strip (e.g., the front surface 520 of the rigid support strip 406). In another example, the liner material may be coupled to a side surface of the first rigid support strip (e.g., the second side surface 518 of the rigid support strip 404) and a side surface of the second rigid support strip (e.g., the first side surface 522 of the rigid support strip 406). In yet another example, the liner material may be coupled to a rear surface of the first rigid support strip (e.g., a rear surface 720 of the rigid support strip 404) and a rear surface of the second rigid support strip (e.g., a rear surface 820 of the rigid support strip 406).

Figure 9:
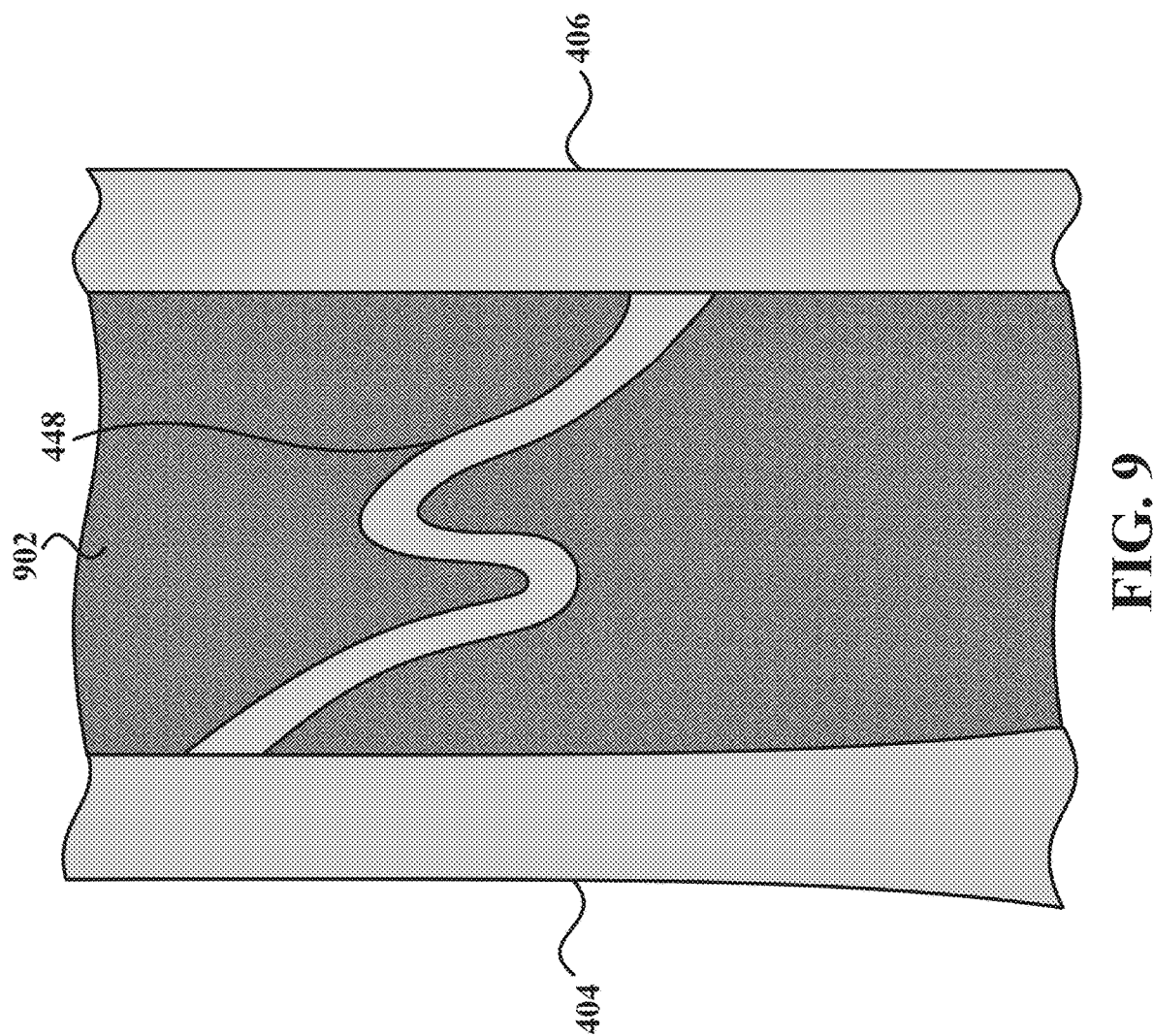
FIG. 9 shows a portion of a liner material coupled to rigid support strips in accordance with various aspects of the disclosure.

In some configurations, the liner material may control deflections of the rigid support strips (e.g., limit bending of the rigid support strips). This may allow the flexible shell structure 400 to support a greater amount of weight (e.g., a heavy stage costume) while reducing warping of its original shape. For example, FIG. 9 shows a portion of a liner material 902 coupled to the rigid support strips 404 and 406. In some examples, the liner material 902 may be coupled to all of rigid support strips of the flexible shell structure 400 shown in FIG. 4. For example, the liner material may be a natural textile (e.g., a cotton fabric), a synthetic textile (e.g., a polyester fabric), a flexible plastic sheet, or a combination thereof.

In some aspects of the present disclosure, there may be a correlation between the respective dimensions and shape of each rigid support strip (e.g., the rigid support strip 401, 402, 404, 406, 408) and the respective dimensions and shape of each coupling member (e.g., the coupling member 420, 422, 424, 426, 428, 440). For example, the width and thickness of each rigid support strip and the diameter of each coupling member may be increased to increase the overall strength of the flexible shell structure, while reducing the flexibility of the flexible shell structure. However, some configurations of the flexible shell structure may not adhere to the previously described correlation. For example, to suit the strength and flexibility needs of a given application, the diameter of one or more coupling members may be greater than the width and/or thickness of one or more of the rigid support strips.

In some aspects of the present disclosure, different regions of the flexible shell structure 400 (or different regions of the flexible shell structure 1002) may have different amounts of flexibility. For example, with reference to the flexible shell structure 400 in FIG. 4, an end region of the flexible shell structure 400 including the rigid support strip 401 may have a greater amount of flexibility relative to a center region of the flexible shell structure 400 including the rigid support strips 406, 408. This configuration may enable the flexible shell structure 400 to provide greater flexibility near a moveable joint of an animated figure or puppet, while providing a suitable amount of rigidity (e.g., strength) to support a stage costume of the animated figure or puppet.

Figure 10:
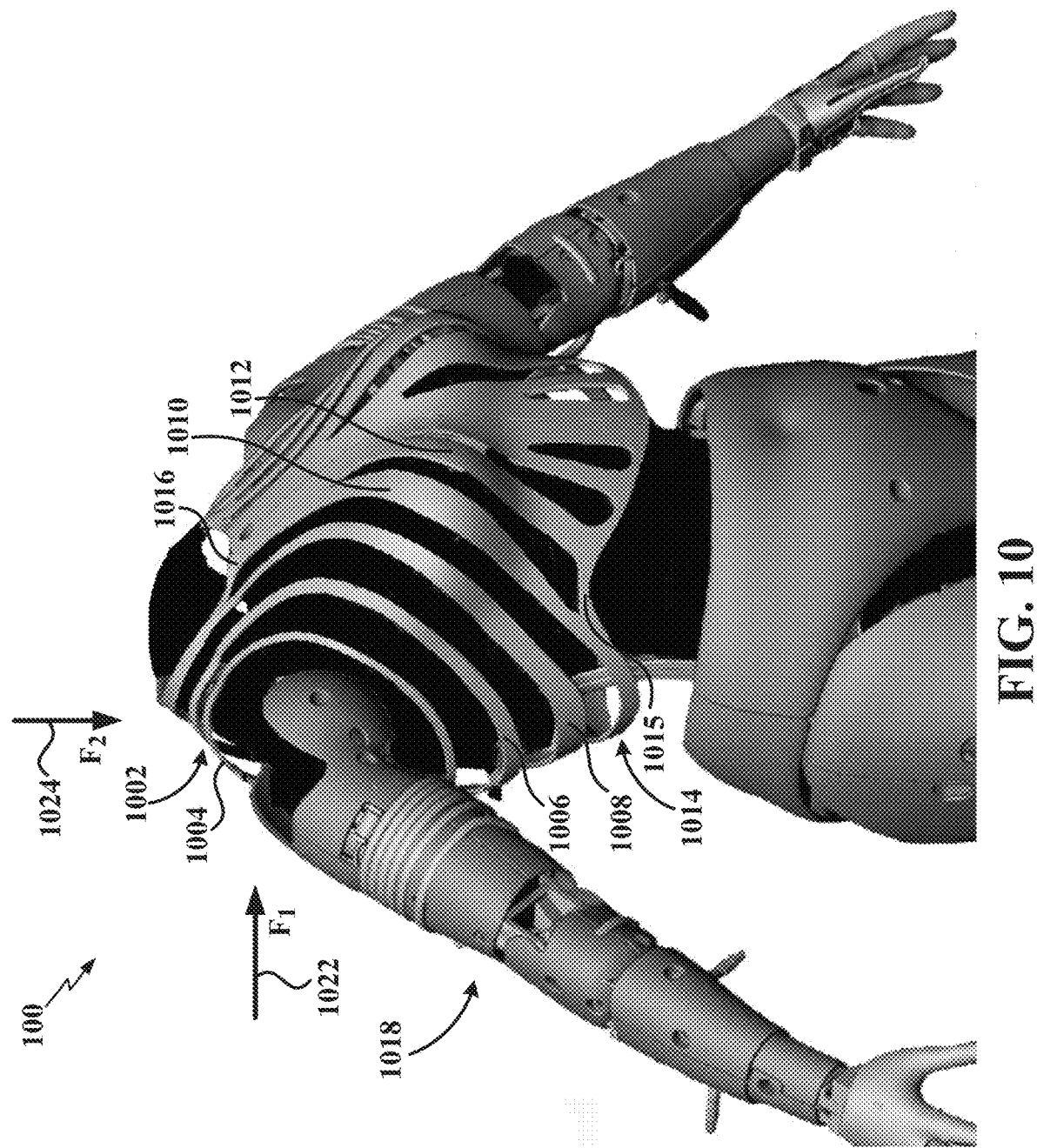
FIG. 10 shows a flexible shell structure in accordance with various aspects of the disclosure.

FIG. 10 shows a flexible shell structure 1002 in accordance with various aspects of the present disclosure. As shown in FIG. 10, the flexible shell structure 1002 may include a number of rigid support strips, such as the rigid support strips 1004, 1006, 1008, 1010, 1012. In some examples, one or more of the rigid support strips may be formed using a rigid and relatively lightweight material as previously described with reference to the flexible shell structure 400. In the aspects described with reference to FIG. 10, one or more of the rigid support strips (e.g., the rigid support strips 1004, 1006, 1008, 1010, 1012) may have a curved shape.

In the example implementation of FIG. 10, the rigid support strips having curved shapes (e.g., the rigid support strips 1004, 1006, 1008, 1010, 1012) define a three-dimensional shape of a human torso. In some example implementations, the three-dimensional shape may be a different part of a human character form, a part of an animal or creature character form, or a part of an object character form. For example, the three-dimensional shape may be a body, a leg, or a tail of an animal character form.

The rigid support strips of the flexible shell structure 1002 may be coupled together with one or more coupling members, such as the coupling members 1014, 1016. The one or more coupling members may allow at least some of the rigid support strips (e.g., the rigid support strips 1004, 1006, 1008, 1010, and/or 1012) to flex in response to a first force (e.g., force $F_1$ 1022 resulting from a movement of the articulated arm 1018 toward the flexible shell structure 1002) and resist flexing in response to a second force (e.g., force $F_2$ 1024). As shown in FIG. 10, a direction of the first force (e.g., force $F_1$ 1022) may be approximately perpendicular to a direction of the second force (e.g., force $F_2$ 1024). It should be understood that the coupling members of the flexible shell structure 1002 allow the flexible shell structure 1002 to return to its original shape when the first force (e.g., force $F_1$ 1022) is no longer applied.

For example, with reference to FIG. 10, a region of the flexible shell structure 1002 including the rigid support strips 1004, 1006 may have a greater amount of flexibility relative to a region of the flexible shell structure 1002 including the rigid support strips 1010, 1012. In some aspects, the different amounts of flexibility may be associated with a respective shape of each rigid support strip of the plurality of rigid support strips. For example, the rigid support strips 1010, 1012 may be shorter, wider, and may have less curvature relative to the rigid support strips 1002, 1004. In this example, the center of the flexible shell structure 1002 (e.g., the region including the rigid support strips 1010, 1012) may have lower flexibility and greater strength relative to the ends of the flexible shell structure 1002 (e.g., the region including the rigid support strips 1004, 1006).

In the previously described aspects shown in FIGS. 4-10, the flexibility of the described flexible shell structures (e.g., the flexible shell structures 400, 1002) may improve the range of motion of an animated figure, puppet, or other object. For example, if the flexible shell structure 400 (or the flexible shell structure 1002) is coupled to the animated FIG. 100 shown in FIG. 3C in place of the solid shell structure 118, the flexible shell structure 400 may flex when the articulated arm 104 is moved to the second position 322 or the fourth position 326. This may allow a greater range of movement of the articulated arm 104 relative to the range of movement allowed by the solid shell structure 118. Moreover, the flexibility of the flexible shell structure 400 may avoid damage to the flexible shell structure 400 in scenarios where the articulated arm 104 makes contact with the flexible shell structure 400.

It should be noted that the flexible shell structure 400 (or the flexible shell structure 1002) is configured to flex when a force is applied in one direction (e.g., force $F_3$ 436 in FIG. 4 resulting from the movement of the articulated arm 104 to the second position 322 or the fourth position 326) and to resist flexing when another force is applied in a different direction (e.g., force $F_2$ 434 in FIG. 4 resulting from a weight of a stage costume and applied in a direction perpendicular to the force $F_3$ 436). Accordingly, the design of the flexible shell structure 400 may flex to improve range of motion (e.g., for an animated figure or puppet), while providing sufficient rigidity to support a covering (e.g., a relatively heavy stage costume or other suitable covering).

Figure 11:
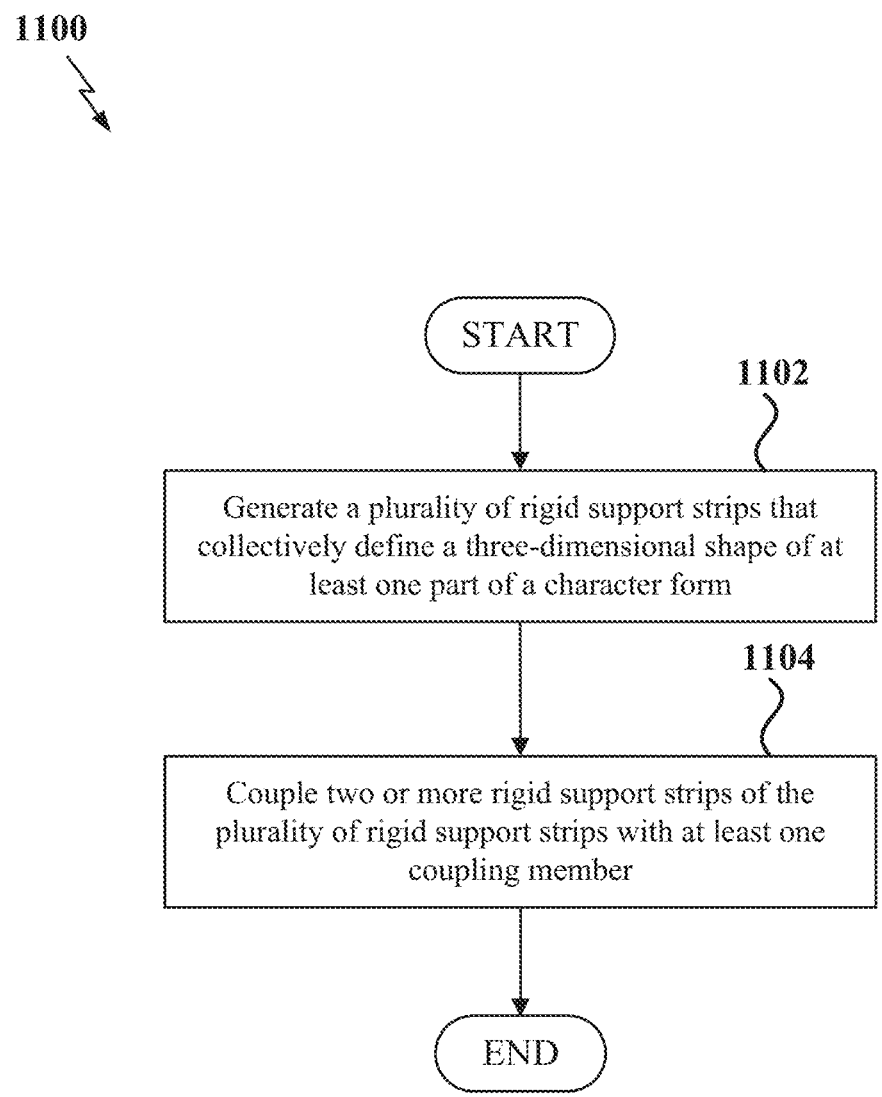
FIG. 11 is a flow chart in accordance with various aspects of the disclosure.

FIG. 11 is a flow chart illustrating an exemplary process 1100 for generating a flexible shell structure (e.g., the flexible shell structure 400 or the flexible shell structure 1002) according to an aspect of the present disclosure. As described below, some or all illustrated features may be omitted in a particular implementation within the scope of the present disclosure, and some illustrated features may not be required for implementation of all embodiments. The process 1100 may be carried out by any suitable apparatus or means for carrying out the functions or algorithm described below. In some examples, the apparatus may be a 3D printing device.

At block 1102, the apparatus generates a plurality of rigid support strips (e.g., the rigid support strips 401, 402, 404, 406, 408 or the rigid support strips 1004, 1006, 1008, 1010, 1012) that collectively define a three-dimensional shape of at least one part of a character form. In some examples, the character form may be based on a human character form, an animal character form, a character form of a fictional creature, or an object character form (e.g., an anthropomorphic object as described herein).

At block 1104, the apparatus couples two or more rigid support strips of the plurality of rigid support strips with at least one coupling member (e.g., the coupling member 448 or the coupling members 1014, 1016). The at least one coupling member enables the flexible shell structure to flex when a first force is applied to the flexible shell structure in a first direction, and enables the flexible shell structure to resist flexing when a second force is applied to the flexible shell structure in a second direction. In some examples, the first direction may be approximately perpendicular to the second direction. In some examples, the flexibility of the flexible shell structure may be based on at least one of a length or thickness of the at least one coupling member.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A flexible shell structure, comprising:
   a plurality of rigid support strips that collectively define a three-dimensional shape of at least one part of a character form; and
   at least one coupling member configured to couple two or more rigid support strips of the plurality of rigid support strips, wherein a first end of the at least one coupling member is coupled to a side surface of one rigid support strip of the two or more rigid support strips and a second end of the at least one coupling member is coupled to a side surface of another rigid support strip of the two or more rigid support strips,
wherein the at least one coupling member enables the flexible shell structure to flex when a first force is applied to the flexible shell structure in a first direction, and enables the flexible shell structure to resist flexing when a second force is applied to the flexible shell structure in a second direction.

2. The flexible shell structure of claim 1, wherein at least one portion of the flexible shell structure is attached to a show element structure.

3. The flexible shell structure of claim 2, wherein the show element structure includes an animated figure, a robotic figure, a puppet, a walk-around character, an interactive character, a theatrical prop, a static prop, or an animated prop.

4. The flexible shell structure of claim 2, wherein at least a portion of the flexible shell structure is configured at or near a moveable joint of the show element structure, and wherein the flexible shell structure is configured to flex in response to a movement of the moveable joint.

5. The flexible shell structure of claim 1, wherein the first direction is approximately perpendicular to the second direction.

6. The flexible shell structure of claim 1, wherein a flexibility of the flexible shell structure is based on at least one of a length or a thickness of the at least one coupling member.

7. The flexible shell structure of claim 6, wherein the plurality of rigid support strips are spaced apart by separation distances, and wherein the flexibility of the flexible shell structure is further based on the separation distances.

8. The flexible shell structure of claim 7, wherein at least two of the separation distances are different.

9. The flexible shell structure of claim 1, wherein at least one rigid support strip of the plurality of support strips has at least a first width and a second width.

10. The flexible shell structure of claim 1, wherein at least one rigid support strip of the plurality of support strips has at least a first thickness and a second thickness.

11. The flexible shell structure of claim 1, wherein a rigidity of each rigid support strip of the plurality of rigid support strips is based on at least one of a width or a thickness of each rigid support strip of the plurality of support strips.

12. The flexible shell structure of claim 1, wherein different regions of the flexible shell structure have different amounts of flexibility, and wherein the different amounts of flexibility are associated with a respective shape of each rigid support strip of the plurality of rigid support strips.

13. The flexible shell structure of claim 1, wherein at least one rigid support strip of the plurality of support strips has a curved shape.

14. The flexible shell structure of claim 1, further comprising a liner material coupled to at least two rigid support strips of the plurality of rigid support strips.

15. The flexible shell structure of claim 14, wherein the at least two rigid support strips includes a first rigid support strip and a second rigid support strip, and wherein the liner material is coupled to
a first rear surface of the first rigid support strip and a second rear surface of the second rigid support strip,
a first front surface of the first rigid support strip and a second front surface of the second rigid support strip, or
a first side surface of the first rigid support strip and a second side surface of the second rigid support strip.

16. The flexible shell structure of claim 14, wherein the liner material includes at least one of a natural textile, a synthetic textile, or a flexible plastic sheet.

17. The flexible shell structure of claim 1, wherein the flexible shell structure is a part of a show element.

18. The flexible shell structure of claim 17, wherein the show element comprises a tangible figure, a tangible object, a tangible device, or a tangible system.

19. The flexible shell structure of claim 1, wherein the character form includes a human character form, an animal or creature character form, or an object character form.

20. The flexible shell structure of claim 1, wherein the flexible shell structure is covered with a flexible material to simulate a skin for the character form, the flexible material including at least one of a silicone material, a urethane material, a foam material, or a rubber material.

21. The flexible shell structure of claim 1, wherein the flexible shell structure simulates a presence of the character form under a covering.

22. The flexible shell structure of claim 21, wherein the covering includes at least one item of clothing.

23. The flexible shell structure of claim 21, wherein the covering includes a flexible material, the flexible material comprising at least one of a rubber material, a silicone material, a vinyl material, a urethane material, a neoprene material, a foam material, a fabric, or a textile.

24. The flexible shell structure of claim 1, further comprising:
at least one other coupling member configured to couple the two or more rigid support strips of the plurality of rigid support strips,
wherein the at least one other coupling member is coupled to an end of a first rigid support strip of the two or more rigid support strips and an end of a second rigid support strip of the two or more rigid support strips.

25. A method for generating a flexible shell structure, comprising:
generating a plurality of rigid support strips that collectively define a three-dimensional shape of at least one part of a character form; and
coupling two or more rigid support strips of the plurality of rigid support strips with at least one coupling member, wherein a first end of the at least one coupling member is coupled to a side surface of one rigid support strip of the two or more rigid support strips and a second end of the at least one coupling member is coupled to a side surface of another rigid support strip of the two or more rigid support strips,
wherein the at least one coupling member enables the flexible shell structure to flex when a first force is applied to the flexible shell structure in a first direction, and enables the flexible shell structure to resist flexing when a second force is applied to the flexible shell structure in a second direction.

* * * * *